CONTROLLABLE MAGNETIC STORAGE CIRCUIT

Filed May 21, 1962 6 Sheets-Sheet 1

INVENTOR
G. W. DICK
BY
[signature]
ATTORNEY

INVENTOR
G. W. DICK
BY
[signature]
ATTORNEY

CONTROLLABLE MAGNETIC STORAGE CIRCUIT

Filed May 21, 1962 6 Sheets-Sheet 3

INVENTOR
G. W. DICK
BY
Charles Scott Phelan
ATTORNEY

CONTROLLABLE MAGNETIC STORAGE CIRCUIT

Filed May 21, 1962

INVENTOR
G. W. DICK
BY
Charles Scott Phelan
ATTORNEY

INVENTOR
G. W. DICK
BY
Charles Scott Phelan
ATTORNEY

CONTROLLABLE MAGNETIC STORAGE CIRCUIT

Filed May 21, 1962 6 Sheets-Sheet 6

INVENTOR
G. W. DICK
BY
Charles Scott Phelan
ATTORNEY

United States Patent Office 3,192,511
Patented June 29, 1965

3,192,511

CONTROLLABLE MAGNETIC STORAGE CIRCUIT

George W. Dick, Morris Township, Morris County, N.J., assignor to Bell Telephone Laboratories, Incorporated, New York, N.Y., a corporation of New York Filed May 21, 1962, Ser. No. 196,214
30 Claims. (Cl. 340—174)

This invention relates to a controllable magnetic storage circuit. More particularly it relates to such a circuit that is useful in all-magnetic shift registers, i.e., those shift registers which for proper operation depend upon only magnetic elements and circuit leads.

Magnetic information storage elements are well known and typically comprise a magnetic material with a substantially rectangular hysteresis characteristic defining two stable remanent flux conditions at or near saturated flux for the material. The information may be removed from or set into the element. In addition, the element may be switched from either of those conditions to the other by subjecting it to a properly oriented magnetic field capable of applying a magnetomotive force that is at least equal in magnitude to the coercive force required for switching. Magnetic elements of this type have been organized into many different devices for storing information.

Electric circuits utilizing such magnetic devices have a number of well-known advantages over analogous conventional circuits. Two of the more significant advantages are that magnetic devices are inherently stable over a wide range of environmental conditions, and they are not significantly affected by aging. These characteristics make it desirable to employ magnetic devices in information processing systems such as shift registers. Accordingly, the present invention is described in connection with its application to a shift register.

There are shift registers in the prior art which fall into the all-magnetic classification, but they depend generally upon the use of extra buffer magnetic cores that are driven into saturation to prevent back coupling of information in the register and to prevent the continuous forward passage of information through the register in an uncontrolled manner. The additional current required to operate such buffer cores reduces current available for operating magnetic storage devices and thus reduces their switching speed and the shift register operating speed.

Furthermore, it is also frequently necessary for prior art all-magnetic shift registers to submit to strict limitations in operating speed in order to procure adequate gain for driving the required loads. In some cases a substantial amount of gain is required in order that the shift register may drive more than one load, i.e., provide signal fan-out, or in order that it may drive a single load which demands considerably more energy than is required by a single shift register stage. The all-magnetic circuits often utilize circulating drive current in a coupling loop circuit between driving and driven stages; and if sufficient gain is provided to drive the required loads in the driven portion, there is a definite risk that magnetic devices in the driving stage will be inadvertently switched. This same risk is, of course, presented if large amplitude drives are employed to reduce magnetic element switching times. Accordingly, reduced coupling signal amplitudes and longer switching times are often utilized to safeguard against such possibilities.

It is, therefore, one object of my invention to increase the gain-speed flexibility of all-magnetic shift registers.

Another object is to increase the operating speed of all-magnetic shift registers.

A further object is to provide for all-magnetic shift registers an operating principle which is applicable to the use of many different types of magnetic elements.

These and other objects of my invention are realized in an illustrative embodiment wherein plural bistable magnetic elements are coupled together in a unique manner to comprise a storage circuit for the stages of an all-magnetic shift register. Each storage circuit includes plural branch paths interconnected with one another at nodal points. These paths may be either magnetic or electric, and each path has one of the bistable magnetic elements associated therewith either as an integral part of the path or electromagnetically coupled to the path. Electric input signals are coupled to at least one node of the circuit to switch the magnetic elements in pairs. Electric output signals are derived from at least one other node of the storage circuit. The input and output nodes are conjugately related so that the elements can be switched in pairs to generate an output signal without producing an electric signal at the input nodes, and an input signal occurring at a different time can switch elements in another pair grouping of the same elements without introducing a substantial signal at the output nodes.

It is one feature of the invention in shift register applications that the return current to a driving section always flows through at least as many nonswitching elements in the driving section as there are switching elements in the driven stage.

It is a feature of one embodiment of the invention that the magnetic elements are arranged in a unique manner in the storage circuit so that a drive loop circuit embracing two successive sections of the register carries a current which is primarily operative on a single magnetic element in the driven section but which influences in parallel a greater number of elements in the driving section. It is possible, therefore, for the drive current in the driven section to have a magnitude which is approximately equivalent to the total magnitude required to generate the threshold switching field for the mentioned greater number of elements of the driving section. Consequently, the large drive current risk of prior art all-magnetic shift registers is considerably reduced in significance in the all-magnetic shift register in accordance with this invention.

It is another feature of the invention that the storage circuit may be an electric circuit lattice with toroidal magnetic cores electromagnetically engaging each branch of the lattice and designed and operated to create a conjugate relationship between the input and output terminals of the lattice during information transfer into and out of the circuit. This arrangement inherently limits the direction of shift in a shift register to a selected one of two possible directions of propagation, and it also limits the extent of the shift so that it is not necessary to provide buffer devices that must be saturated in order to obtain isolation. In one embodiment of the invention the toroidal cores associated with the circuit lattice all have the same cross sectional area of magnetic material in a diametric plane perpendicular to the plane of the toroid, but one of the cores of the core pair adjacent to each input terminal of the lattice has a substantially different toroidal diameter from the other core of the pair. This difference in geometry of the cores is used to advantage in producing a simplified shift register circuit which is capable of operation at speeds that are higher than have been heretofore realizable. The same results could also be achieved by using cores with identical geometry but different materials having different coercive forces so that the current switching thresholds are different.

It is another feature of the invention that, in the embodiment which employs single-aperture toroidal cores, input signals of a given polarity are effective to switch both cores of one core pair so that no output signal is produced. However, shift signals applied to one core of each pair in the same sense and at the same time cause core switching in a manner which produces an output electric signal for driving any suitable load circuit.

Still another feature of the invention is the interstage coupling between storage circuit nodes, whether they be nodes of an electric circut or magnetic circuit. This coupling technique facilitates the use of a broad range of schemes for generating the flux gain that is usually necessary for fan-out.

It is yet another feature of the invention that multiaperture magnetic devices may be employed in the storage circuit in a manner which is analogous to the aforementioned lattice type of circuit and wherein the branch paths are magnetic flux paths. Electric signals are coupled to nodal points in the magnetic circuit by electromagnetic coupling to one or more branch paths of the magnetic circuit.

Other objects and advantages of the invention should become apparent to the reader upon a consideration of the following detailed description, and the appended claims, together with the attached drawings in which:

Figure 1:
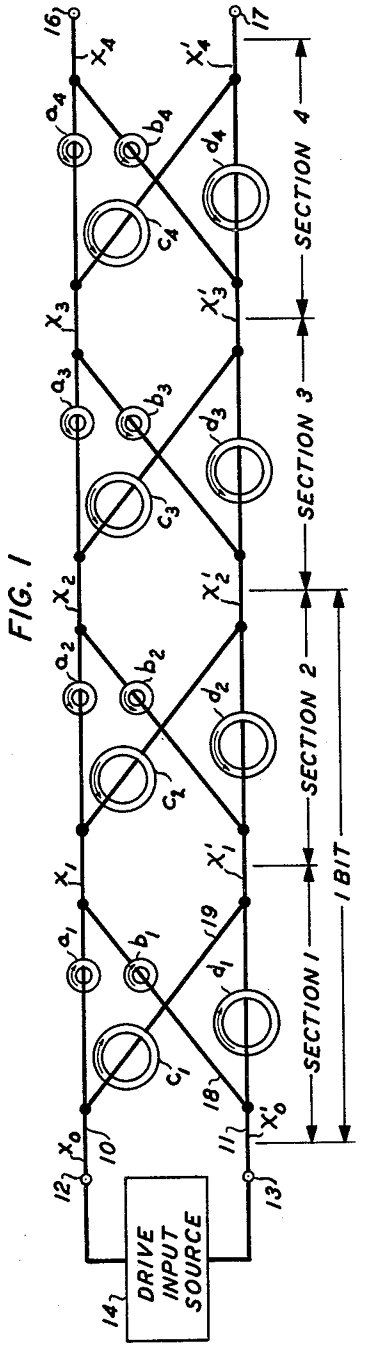
FIG. 1 is a simplified schematic diagram of an electric information transfer circuit of a shift register utilizing the invention.
Figure 2:
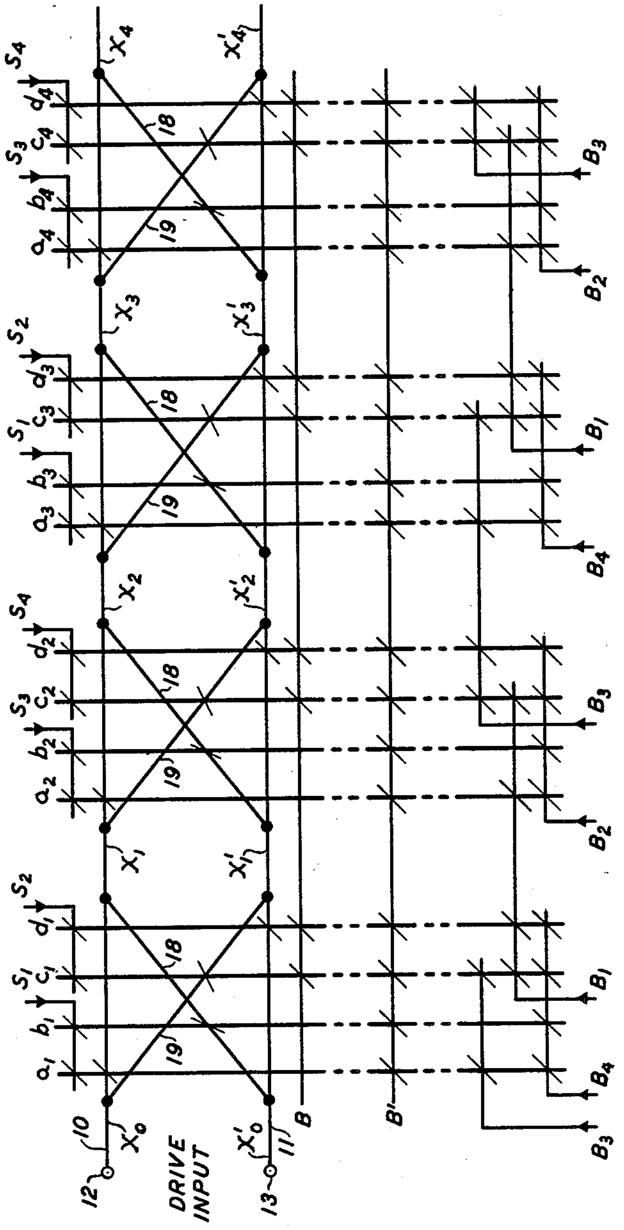
FIG. 2 is a more complete diagram of the shift register of FIG. 1 utilizing mirror image symbology.
Figure 4:
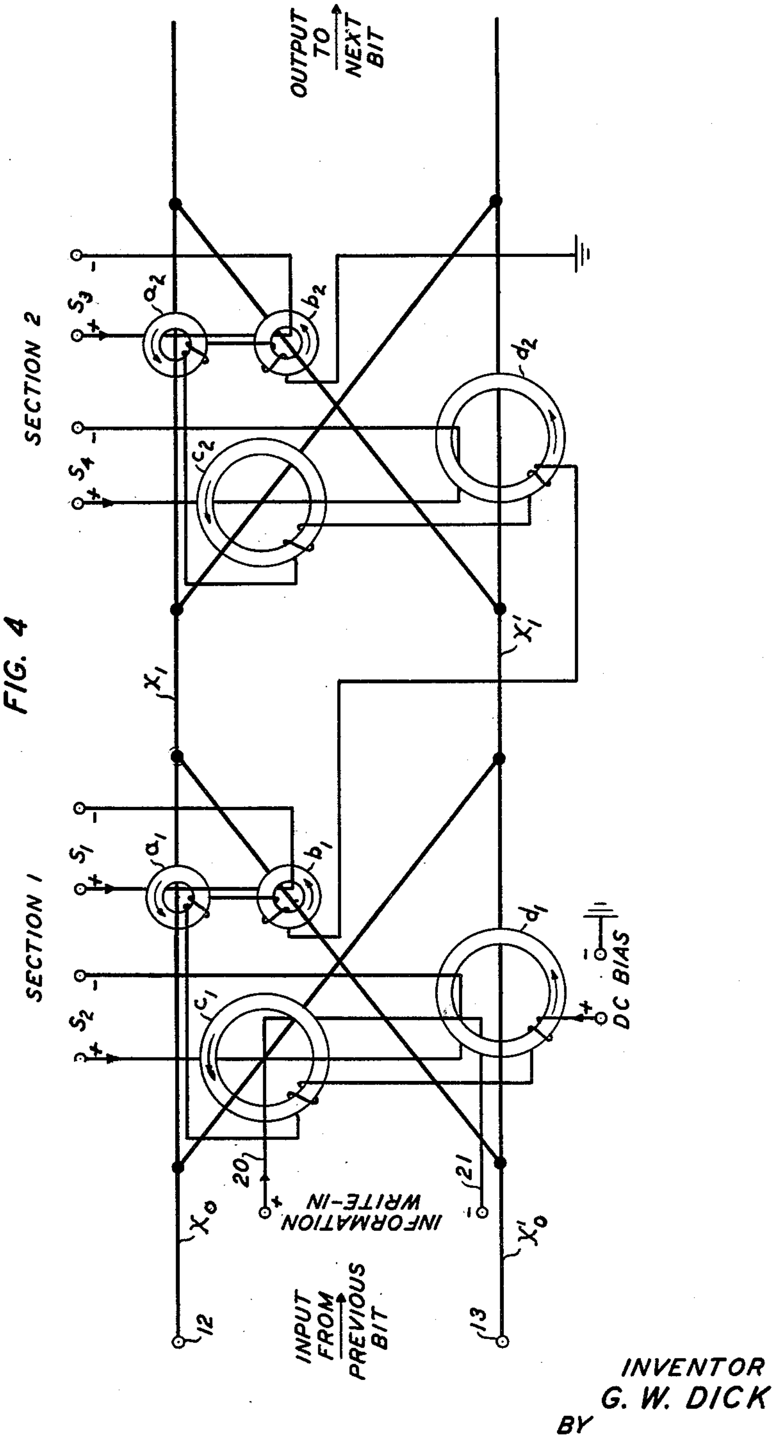
FIG. 4 is a more complete schematic diagram of two sections of the shift register shown in FIGS. 1 and 2 and illustrating cores and winding directions for the various signal circuits which are coupled to the cores.

FIG. 1 is a simplified schematic diagram of two one-bit stages of an all-magnetic shift register utilizing the invention. This embodiment utilizes single-aperture cores. Only the cores and the electric information transfer circuit are shown in order to facilitate an understanding of the invention. Circuits that also include shift and bias connections are shown in FIGS. 2 and 4 and will subsequently be discussed. Each of the cores in FIG. 1 is designated by a letter which is indicative of the position of the core in the circuit and by an associated subscript which indicates the number of the section in the register. Thus, in FIG. 1 each one-bit stage of the register includes two lattice sections; and four such sections are illustrated in FIG. 1.

It will be observed in FIG. 1 that the information transfer circuit includes two leads, 10 and 11, which receive input signals from a drive source 14 at terminals 12 and 13. Leads 10 and 11 connect input terminals 12 and 13 to output terminals 16 and 17. Although lead 10 is continuous between terminals 12 and 16, and lead 11 is continuous between terminals 13 and 17, input signals applied at terminals 12 and 13 do not appear immediately at output terminals 16 and 17. Such signals are shifted through the successive cascade-connected sections of the shift register in controlled steps. Basically the information circuit is an iterative lattice wherein each step comprises a balanced bridge configuration with the lattice input terminals located at the terminals of one diagonal of the bridge and the lattice output terminals located at the terminals of the other bridge diagonal.

The lead 10 laces a plurality of toroidal magnetic cores $a_1$, $a_2$, $a_3$, and $a_4$. Lead 11 laces a second plurality of toroidal magnetic cores $d_1$, $d_2$, $d_3$, and $d_4$, each of which corresponds to a similarly designated one of the cores *a*. Cores *a* and *d* are thus in series branches of a lattice and in opposite arms of the bridge circuit which makes up the lattice. Each core is of any of the well-known magnetic materials having a substantially rectangular hysteresis characteristic which defines two stable remanent magnetic flux conditions corresponding to essentially saturated flux density with opposite polarities. The core may be switched from either of its stable conditions to the other by the application of a properly oriented magnetic field which is at least equal to the coercive field $H_c$ for the core.

Branch leads 18 and 19 for each lattice are cross-connected from the input side of the *d* core thereof to the output side of the *a* core, and from the input side of the *a* core to the output side of the *d* core. These branch leads lace a further plurality of cores *b* and *c*, respectively, in a direction such that current applied to an input terminal of the lattice links the associated series and branch cores in the same sense with respect to such terminal. Furthermore, a circulating current in the bridge loop passes through the four cores alternately in opposite senses. Portions of leads 10 and 11 at lattice input and output terminals are circuit nodes designated $x_0$, $x_0'$, $x_1$, $x_1'$, et cetera.

All of the cores *a*, *b*, *c*, and *d* may be identical, or they may have structural differences, and they will still produce the basic advantages such as inherent balance and current splitting. If cores *a* and *b* have lower coercive forces from cores *c* and *d*, cores *a* and *b* then have a much lower threshold switching current than do cores *c* and *d* and may be more rapidly operated. Such differences in structure may, for example, take the form of different geometries or different materials.

All of the cores *a*, *b*, *c*, and *d* are in the illustrative embodiment constructed of the same magnetic material with the same cross sectional area of magnetic material in a diametric plane that is perpendicular to the plane of the toroid ring. However, the cores *a* and *b* have a substantially smaller toroidal diameter than do cores *c* and *d* so that cores *a* and *b* have a much smaller path length than do cores *c* and *d*. This difference in path length can be in any desired ratio, but a ratio of 4:1 has been found to be convenient. The different path lengths, i.e., coercive forces, are not essential to the operation of the invention; but they have been found to produce further advantageous results beyond those produced by the basic concept of the invention as will be hereinafter described.

In describing the operation of the invention it will be assumed that it is used in connection with a binary signaling system wherein information is represented by permutations of the presence or absence of pulses in successive time intervals. In accordance with one common designation for these two pulse conditions, the presence of a pulse is a ONE and the absence of a pulse is a ZERO. In describing this invention it is assumed that toroidal cores which are in their clockwise saturated condition of magnetization are in their ONE, or set, state while those which are in their counterclockwise saturated condition of magnetization are in the ZERO, or reset, state. Arrows on the cores in FIG. 1 indicate the initial condition of these cores with those in section 1 being in the ONE state while the remaining cores are in the ZERO state. This initial condition in the first section of the register may be written in by a two-phase shift operation from a previous stage of the register, or by a write-in operation from a separate input circuit which will be discussed in condition with FIG. 4.

Figure 3:
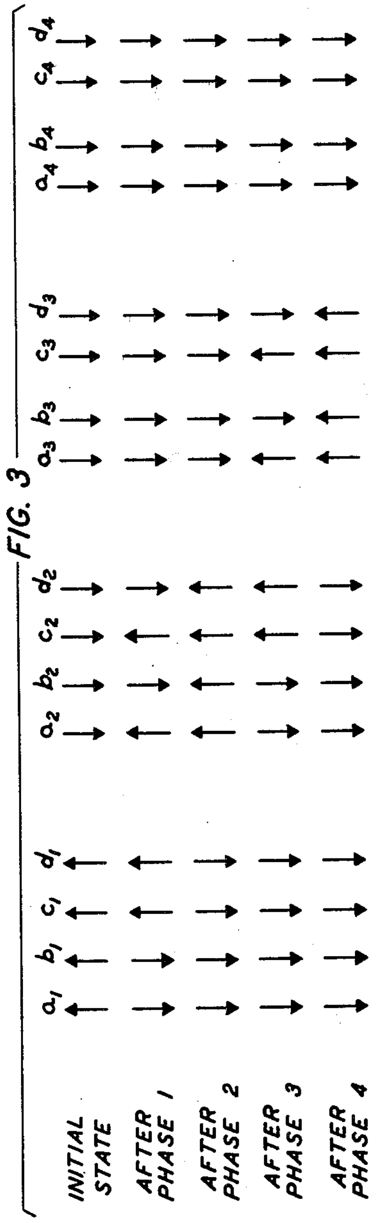
FIG. 3 is an arrow diagram illustrating the conditions of the various cores in the shift register of FIGS. 1 and 2 during a one-bit interval of operation.

In FIG. 2 the circuit of FIG. 1 is illustrated in the simplified "mirror" notation that is a well-known means for depicting magnetic circuits. Briefly, the dark vertical lines represent magnetic cores and have reference characters identical to those employed for the corresponding cores in FIG. 1. Circuit leads electromagnetically engage certain cores at points indicated by a short slanted line intersecting the core representation. The short line is slanted either from lower left to upper right or from upper left to lower right with respect to a particular core to indicate circuit winding direction. If this slanted line is considered to be a mirror, lead current may be considered to be reflected therefrom along the core representation in a direction which corresponds to the direction of the induced flux in the core. Flux will be reflected therefrom in a direction which corresponds to the direction of the induced current in an associated lead. In order to find the direction of current induced in a second winding on a core as a result of the application of current to a first winding, the induced flux is followed in the appropriate direction along the core to the end of the representation thereof, reversed in direction, and returned to the slant line indicating engagement with the aforementioned second winding. At that point the direction of reflection from the slant line indicates the direction of induced current in the second winding. In FIGS. 2 and 3 it is assumed that flux oriented upward represents a ONE and that downward flux represents a ZERO.

In FIG. 2 bias and shift circuits electromagnetically engaging the cores are represented as leads with arrows indicating the direction of current flow therein and with letter designations indicating the type of circuit involved. This schematic representation is considered to include an appropriate source of current and an electric circuit return path thereto although these are not directly shown in the drawing. Drive connections to leads 10 and 11 are not provided with arrows since the drive signal applied at these leads is essentially two-phase with drive pulses of opposite polarities being applied during different time slots. Furthermore, in FIG. 2 there are shown three alternative bias arrangements, two of which are associated with the main portion of the figure by broken line extensions of the core representations to additional core segments wherein the alternative bias connections are shown. For the time being, the simplest arrangement, bias circuit B which is associated with the main portion of FIG. 2, is all that will be considered. Circuit B applies a continuous direct current to cores $c$ and $d$ of each lattice section. The current direction is from left to right in FIG. 2, and the bias circuit engages the cores $c$ and $d$ in each section in a manner which tends to bias the cores to their ONE condition. However, the magnitude of the current is just short of that required to establish the coercive field that would switch the core from the ZERO to the ONE condition, i.e., a threshold magnetomotive is applied by the bias circuit B to cores $c$ and $d$.

Since cores $c$ and $d$ have the same magnetic cross section as do cores $a$ and $b$, but have a much larger diameter, the cores $c$ and $d$ require a significantly greater magnetomotive force to accomplish switching from one stable condition to the other. If the large cores $c$ and $d$ have a toroidal diameter such that their path lengths are about four times as long as the path length for the small cores $a$ and $b$, it has been found that no bias is needed on the small cores because the switching of a single large core induces a sufficient loop current in the lattice bridge loop to switch one of the small cores from one stable condition to the other without the assistance of a bias current.

Shift circuits S1, S2, S3, and S4 provide four-phase shift signals to the cores of the register to move stored information therethrough in orderly steps. Each shift signal is a pulse with a polarity such that it tends to drive the associated cores to their ZERO condition. This shift pulse has a magnitude which, in the case of circuits S1 and S3 is sufficient to switch, in the driving section, two small cores that have no bias fields established therein and to establish a drive current to the succeeding section sufficient to switch cores $a$ and $c$ therein. The shift pulse magnitude in the case of circuits S2 and S4, is of sufficient magnitude to switch two large cores in the driving section to their ZERO condition in spite of an established threshold bias therein toward the ONE condition and, in addition, to establish a coupling loop current to switch the driven section cores $b$ and $d$.

Considering now the operation of the shift register just described, it is assumed that the cores are established in the initial conditions indicated in FIG. 1, i.e., the cores of section 1 are in the ONE condition and the cores of the remaining sections are in the ZERO condition. Furthermore, all of the cores $c$ and $d$ are biased toward their ONE condition. This initial state of the cores is indicated by the corresponding arrows in FIG. 3, and subsequent operations of the cores in the register may be followed by reference to the arrow diagrams of FIG. 3.

The first phase of the shift signal is a pulse applied to shift circuit S1 in register sections 1 and 3. This signal resets cores $a_1$ and $b_1$ to their ZERO condition but does not affect cores $a_3$ and $b_3$ because those cores are already in their ZERO condition. The changing magnetic field resulting from switching of cores $a_1$ and $b_1$ induces currents in leads 10 and 18 of section 1 which flow into an electric circuit node $x_1$. Such currents combine in the node and drive section 2 of the register tending to set cores $a_2$ and $c_2$ in the ONE condition. The same currents also tend to reset cores $b_2$ and $d_2$ but have no effect thereon because these cores are already in their ZERO condition. The drive currents recombine at node $x_1'$ on lead 11 and flow back into section 1 where they split between lead 11 and lead 19.

Cores $a_2$ and $c_2$ switch to their ONE condition and absorb the voltage introduced in the coupling loops including nodes $x_0$, $x_1$, $x_2$, $x_1'$, $x_0$ and $x_0'$, $x_1$, $x_2'$, $x_1'$, $x_0'$ by the switching of cores $a_1$ and $b_1$ to their ZERO conditions. Since core $c_2$ is prebiased, as previously described, toward its ONE condition, it does not require a large drive current. Also, since cores $b_2$ and $d_2$ cannot switch due to the direction of their drive currents at this time, terminals $x_2$ and $x_2'$ are effectively shorted; and further forward transmission of the drive current is prevented. Since core $c_2$ is switched on the first shift phase, then core $a_2$ must also be switched because they are, in effect, in parallel connected circuits which must have the same potential difference thereacross. It can be seen that the drive current returned from section 2 can be considerably larger than the current that is required to switch core $c_2$ with the assistance of the bias provided without danger of prematurely switching the conditions of any cores in section 1. The reason is that the return current from section 2 to section 1 is split at node $x_1'$ and divided substantially equally between the section 1 branches linking cores $c^1$ and $d_1$. There is, thus, no danger of switching cores $c_1$ and $d_1$ by this return current until such current attains a magnitude which is more than twice that required to overcome the bias and produce the coercive field of a single one of the cores $c_1$ or $d_1$. This safety margin due to the current splitting, plus the additional margin due to the prebiased fields in cores $c_1$, $d_1$, and $c_2$, permits an extremely large drive signal to be applied to section 2 to produce a fast switching operation.

It should be further noted in connection with the portion of the operation just described, that because the drive currents are in a direction to shuttle cores $b_2$ and $d_2$, the potential appearing between nodes $x_2$ and $x_2'$ at the output of section 2 is essentially zero. Thus, shift register section 3 receives no effective drive signal at this time. The section 1 lattice structure is balanced with respect to return currents from section 2 appearing at node $x_1'$ so that the potential appearing between nodes $x_0$ and $x_0'$ is also essentially zero with the result that there is no backcoupling into the previous stages as a result of the shift signals applied by circuit S1.

Upon completion of phase 1, it will be seen in FIG. 3 that cores $c_1$, $d_1$, $a_2$, and $c_2$ are set in their ONE condition, and the remaining cores of the shift register are reset in their ZERO condition. At this time shift circuit S2 applies a pulse to override the bias and switch cores $c_1$ and $d_1$ to their ZERO condition. The result of this switching is to induce currents in section 1 leads 19 and 11 which flow into node $x_1'$ and drive section 2.

In section 2 the drive current splits between leads 18 and 11 therein and generates fields which cooperate with the bias field in core $d_2$ to set cores $b_2$ and $d_2$ to their ONE condition. The drive currents also tend to reset cores $a_2$ and $c_2$ to their ZERO condition. Since cores $c_2$ and $d_2$ were prebiased toward the ONE condition, it requires less current to set core $d_2$ to the ONE state than to reset core $c_2$ to the ZERO state. In the limit, the net field on core $d_2$ due to coupling wire current and bias may exceed the switching threshold of core $d_2$ by an amount equal to two units of bias field before the resetting threshold of core $c_2$ is exceeded. Core $c_2$ is not reset as long as drive current stays within that limit.

It has been found that core $a_2$ does not reset during the second shift phase. This is perhaps due to the shunting of drive current from node $x_2$, through large cores $c_3$ and $d_3$, to node $x_2'$. The latter cores represent a much lower impedance than do either of the small cores $a_2$ or $a_3$, and cores $c_3$ and $d_3$ divert sufficient current away from core $a_2$ to prevent it from switching. Cores $c_3$ and $d_3$ are not significantly affected by the small branch current from core $b_2$ so the forward propagation of drive current is limited.

If it is desired to preserve absolute symmetry and further to insure no current output from section 2, cores $b_2$ and $a_2$ may also be biased in a manner that will be described. Thus, on the second shift phase core $b_2$ would be set to the ONE condition and core $a_2$ would remain unchanged. In this situation core $a_2$ is prebiased to the ONE condition and presents such a low impedance to the current from core $b_2$ that there would be no current shunted to section 3.

The return current to section 1 is split as before, and it tends to reset cores $a_1$ and $b_1$ and set cores $c_1$ and $d_1$. Cores $a_1$ and $b_1$ are not affected since they were previously reset during phase 1 of the shift signal. Cores $c_1$ and $d_1$ continue to the reset condition under control of the shift current. It will be noted that the conjugate relationship between the input and output nodes of the lattice once more prevents the drive currents from producing any significant drive potential between nodes $x_2$ and $x_2'$ thereby limiting forward shift during the second shift phase, and the conjugacy also prevents reverse shift by producing substantially equal potentials at nodes $x_0$ and $x_0'$. In other words, the conjugate relationship in the lattice networks causes network nodes to be shorted or to be placed at balanced potentials so that the flow of information in the network is restricted.

During succeeding time slots shift pulses are applied first to shift circuit S3 and then to shift circuit S4 to complete the transfer of the ONE, which is now stored in section 2, to section 3 of the register in much the same manner that the ONE was shifted as previously described from section 1 to section 2. Although only two phases are required to shift information from one section to another two sections per bit position are provided in the register, along with four phases of shift signals, in order that successive ONES in a data message may be transferred into cleared and isolated sections of the register.

The alternative bias circuit B' in FIG. 2 laces all of the cores of the register in the same sense so that a positive direct current applied at the left-hand end of the circuit as indicated would tend to bias all cores toward their ONE condition. If cores of different toroidal diameters are employed, as illustrated in FIG. 1, corresponding different number of turns are used on the cores of different sizes so that a given bias current biases each of the cores near its switching threshold. This type of bias circuit would be somewhat more expensive to manufacture than the circuit B and would require somewhat larger shift signals in circuits S1 and S3 to override the bias. However, it provides significantly more insurance against unbalanced currents flowing in sections of the register which conceivably might cause improper switching of cores during register operation.

A second alternative configuration for bias circuits in the shift register of FIG. 2 is shown at the bottom of that figure and comprises a four-phase pulse bias arrangement wherein bias signals in phase with corresponding shift signals are applied to those cores where there is the greatest possibility of spurious switching and where bias will speed up desired switching operation. All bias signals in this situation tend to set their respective cores to the ONE condition. The signals are also of an appropriate magnitude to bias their respective cores near the switching threshold with the aid of appropriate different numbers of turns as may be required for the geometry of each particular core.

The embodiment shown in FIG. 2 utilizes a four-phase bias system in the alternative pulse bias circuit. Odd numbered phases are applied to circuits $B_1$ and $B_3$ and act in concert with their correspondingly numbered shift circuits to oppose the reset tendency in a driving section of the $c$ and $d$ cores in the return path of the drive current. These odd numbered bias phases also act in concert with their correspondingly numbered shift circuits to aid the setting tendency of cores $a$ and $c$ in the driven stage in response to the drive current. Even numbered bias phases act in concert with their correspondingly numbered shift phases to aid the setting tendency of the $b$ and $d$ cores in the driven section and to oppose the reset tendency of the $a$ and $c$ cores in the driven section. The pulsed arrangement is, of course, more expensive than either of the other alternative bias arrangements, but it provides more direct control both in inhibiting spurious switching and in aiding the desired switching. It does not act on cores that are at the same time being directly influenced by shift pulses and hence reduces the magnetomotive force and pulse power required by the source of shift signals.

Operation with all cores of identical size and threshold might be advantageous in an application where driver power in a long register is to be minimized. Then the smallest cores and lowest thresholds, equal on each core, would be utilized. Operation of the circuit is essentially the same although all cores would necessarily receive bias (either pulsed or direct current). Speed of operation would be reduced somewhat, however, since on phase S1 two equal cores in the driven section would be set, and the return current would divide between two equal and potentially resettable cores in the driving section, i.e., $c_1$ and $d_1$. The advantage of the lattice in this mode of operation is, however, unique in that current splitting in the driving section causes two cores to share the load or current required in switching two receiving cores. Other known circuits, if fabricated with uniform cores, would always have a time slot in which two cores would be set and the load would be taken by a single core. Thus, the drive current in those known circuits must be limited to a value that will not switch the single core; and the operating speed is correspondingly reduced. With the lattice using equal cores all phases require equal drives and have speeds equal to that of the S2 phase in the unequal core form.

FIG. 4 shows the details of cores, winding directions and turn ratios, and circuit connections for two sections of the shift register of FIG. 2. All cores in this case are shown in the ZERO condition, and the B' type of bias is illustrated. Input signals may be applied at terminals 12 and 13 from the source 14, or from another shift register stage, as mentioned in connection with FIGS. 1 and 2. In addition, a supplementary write-in circuit including leads 20 and 21 is shown on cores $c_1$ and $d_1$. This circuits laces both of these cores in the same direction and, as shown, is adapted for the application of a write-in pulse with positive polarity on lead 20 for setting cores $c_1$ and $d_1$ to the ONE condition. It must be noted, however, that such simultaneous action with respect to these two cores must take place during the activation of the S3 or S4 shift circuits in order to prevent the induced currents in the information transfer circuit from driving cores $c_2$ and $a_2$ into their set condition and thereby initiating uninhibited forward propagation of the ONE through the register. Reverse propagation is inhibited because potentials appearing at nodes $x_0$ and $x_0'$ are approximately equal. The remainder of the circuit of FIG. 4 is the same as that shown in FIG. 2 and operates in the same fashion.

Figure 5:
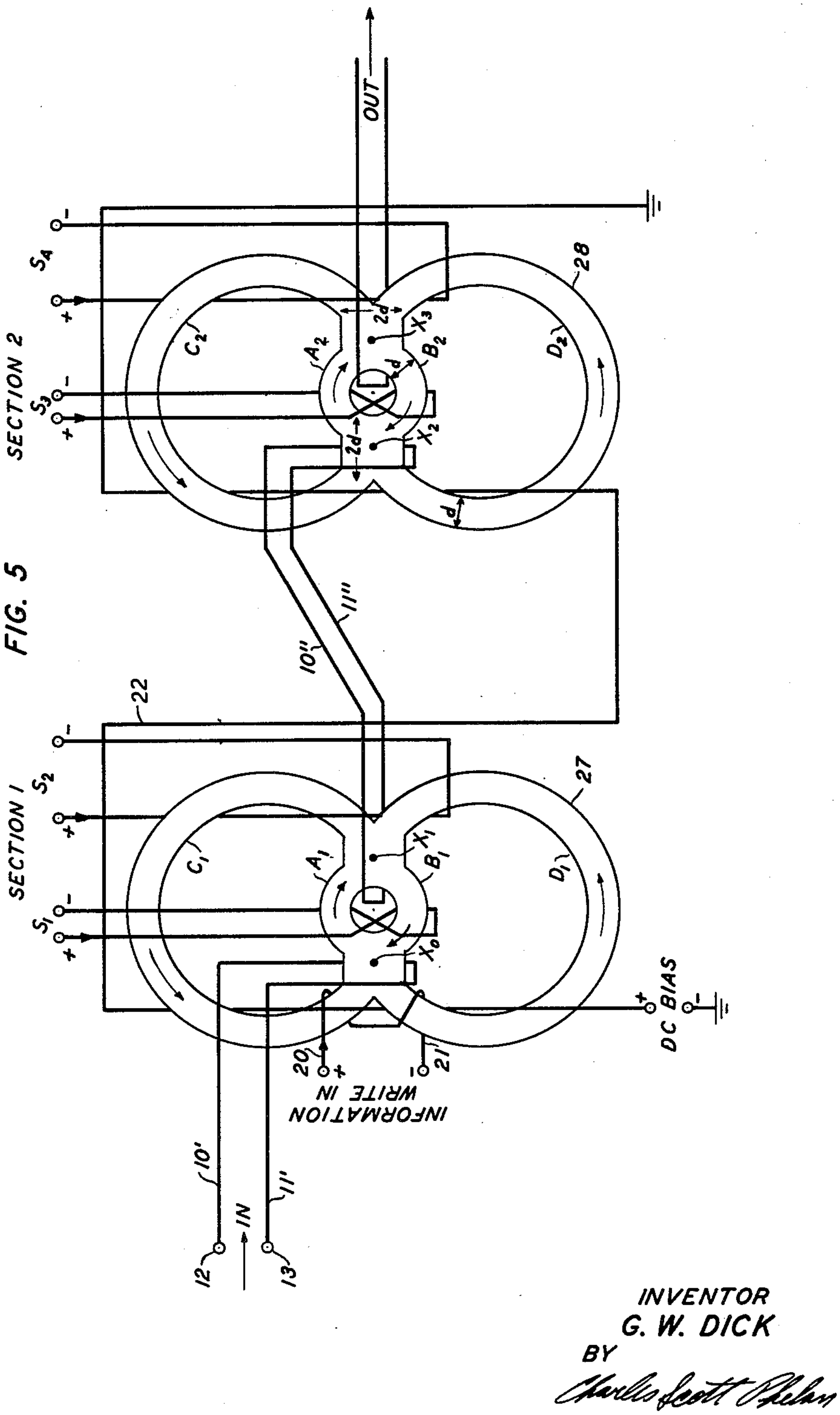
FIGS. 5 and 6 show multiaperture analogous forms of the core circuit illustrated in FIG. 4.

FIG. 5 shows two sections of a shift register which employs multiaperture magnetic devices 27 and 28 in a fashion which is analogous to the manner in which the single-aperture toroidal cores were used in the circuits of FIGS. 1, 2, and 4. Each of the multiaperture devices in FIG. 5 includes two large apertures and one small aperture arranged somewhat in the configuration of a figure eight with the small aperture at the intersection of the two portions of the figure. The magnetic material associated with each branch path of the multiaperture device may be the same as that employed in the toroidal cores, and the cross sectional area of all portions of each device is the same except at the path junctions, or anodes, on either side of the small aperture. At the nodes the cross sectional area, in both the vertical and the horizontal planes perpendicular to the plane of the drawing, is twice the area in all other portions. This area relationship is indicated by dimension designation "$d$" or "$2d$" on device 28.

Each of the devices includes four magnetic circuit elements corresponding to the four cores in FIGS. 1 and 4, and this similarity is indicated by the reference characters $A_1$, $B_1$, $C_1$, and $D_1$. The elements comprise branch paths in the magnetic circuit of the device. The left-hand ends of all of these magnetic circuit paths flow together at a magnetic circuit node $X_0$, and the right-hand ends of the paths converge at a node $X_1$.

Input terminals 12 and 13 in FIG. 5 are electromagnetically coupled to node $X_0$ by means of the lead 10′–11′ which is arranged to link the large apertures of the devices in section 1 so that flux conditions at that node may be influenced by signals applied at terminals 12 and 13. This is accomplished by coupling of the lead 10′–11′ to the branches $C_1$ and $D_1$ of the three-aperture device 27. It will be seen when the operation of the shift register of FIG. 5 is subsequently described that signals applied at terminals 12 and 13 are able to influence magnetic flux conditions in all four branches of the device in section 1 in a manner which is analogous to the way in which electric signals applied at terminals 12 and 13 of FIG. 1 influence flux conditions in the four cores of section 1 in that figure.

The output circuit for section 1 is interconnected with the input circuit for section 2 to form a closed loop including leads 10″ and 11″. In section 1 these leads link the small aperture of the device 27 at node $X_1$ in order to sense certain flux changes in the four branches of the device. It will be noted that input circuit 10′–11′ links the device at node $X_0$ in what might be considered a perpendicular relationship with respect to the linking of output circuit 10″–11″ at node $X_1$. This relationship preserves the conjugacy of the two circuits, that is, flux generated by current in input circuit 10′–11′ can effect changes in the magnetization around the upper aperture defined by branches A and C and the lower aperture defined by branches B and D. However, output circuit 10″–11″ is, because of its perpendicular orientation with respect to the input circuit, sensitive to only those flux changes which take place simultaneously in the outer magnetic loop defined by branches C and D or simultaneously in the inner loop defined by branches A and B.

Shift circuit S1 links the short branches A and B of the magnetic device 27 while shift circuit S2 links the long branches C and D. The arrangement of section 2 in the register of FIG. 5 is similar to that of FIG. 1 with respect to the shift, bias, input, and output circuits as well as the core device configuration. Device 28 is operated during shift phases three and four while device 27 is operated during phases one and two.

The operation of FIG. 5 may be considered by assumfirst that both devices are in the ZERO condition. In this condition the device branches defining the large upper and lower apertures are magnetized in the counterclockwise direction around those apertures. A ONE may be written into section 1 by the application of a single pulse on leads 20 and 21 with the polarity indicated. This pulse sets branches of the magnetic circuit to display clockwise magnetization around both the upper and the lower device apertures. This constitutes the ONE condition for the section. Such a write-in operation should take place at a time when the device is in its aforementioned ZERO condition and a shift pulse in either circuit S3 or S4 is being applied to section 2, so that the direction of magnetization about each of the large apertures is reversed. When both are reversed at the same time there is no signal induced in output circuit 10″–11″ because there is no change in the flux linking that circuit, i.e., in spite of the aforementioned magnetization reversal, the flux before and after the reversal is parallel to the plane of the output circuit at node $X_1$. A similar write-in can be accomplished in a two-phase operation by means of signals applied to input terminals 12 and 13 in the same manner that information is shifted between sections, as will be subsequently described.

A direct-current bias in the manner of bias circuit B of FIG. 2 is applied by supplying a direct current with the polarity indicated to the lead 22 which links all of the large apertures in series in the same sense, i.e., in the sense which tends to bias branches C and D of each device toward the ONE condition.

Turning now to the operation of shifting information through the register, assume that section 1 is in the ONE condition and section 2 is in the ZERO condition. These initial conditions for the magnetic circuit branches, and the conditions after each shift phase, are the same as those indicated in FIG. 3 for the correspondingly designated cores if it is assumed that an upward arrow indicates a magnetic branch set in the direction of ONE magnetization in its device and a downward arrow indicates a ZERO.

A shift pulse is applied to circuit S1 with the polarity indicated and reverses the magnetization in branches $A_1$ and $B_1$ to establish a clockwise magnetization in those branches around the small center aperture of device 27. The bias field prevents branches $C_1$ and $D_1$ from switching in a similar manner at this time, and each of these branches finds a return path for its flux through the other branch to maintain a clockwise magnetization in the large outer loop defined by branches $C_1$ and $D_1$. The reversal of flux in the small loop of branches $A_1$ and $B_1$, and the maintenance of clockwise magnetization in the large outer loop of branches $C_1$ and $D_1$, without flux reversal, produces a downward magnetization in the vicinity of node $X_1$ wherein the device has twice the cross sectional area that it has in any of its branches. This type of flux change from one loop path to another loop path is, for convenience, termed a transverse flux change. Such a transverse flux change at node $X_1$ produces a clockwise circulating current in the coupling loop defined by leads 10″ and 11″ and thus applies the first phase of a drive current to section 2. This drive current sets branch $C_2$ to its ONE condition and the resulting magnetomotive force reversal between the ends of branch $A_2$ causes a reversal of magnetization therein also. These changes establish clockwise magnetization around the upper aperture in section 2. However, such flux reversal does not involve a transverse flux change at node $X_3$, and there is no output signal produced from section 2.

It should be noted that the transverse flux change at node $X_1$ in section 1 was accompanied by a similar transverse flux change at node $X_0$; but since this latter flux change is in the plane of the winding of input circuit 10′–11′, there is no signal induced in that circuit and, consequently, no reverse propagation of the shift operation.

The second phase of the shift signal is now applied to circuit S2 and resets branches $C_1$ and $D_1$ to the ZERO condition. Since branches $A_1$ and $B_1$ had been previously reset during the first phase, the entire device 27 of section 1 is now reset to the ZERO condition with counterclockwise magnetization prevailing around both of the large apertures. The elimination of the transverse flux at node $X_1$ upon the resetting of branches $C_1$ and $D_1$ induces a counterclockwise current in the coupling loop circuit including leads 10″ and 11″, and this current sets branch $D_2$ to its ONE condition. Since the branches $C_2$ and $A_2$ had been previously set to the ONE condition, the path of least reluctance at this time is for branch $B_2$ to reverse its magnetization and provide a return path for the new magnetization condition of branch $D_2$. Now a clockwise magnetization condition is established around both the upper and lower apertures in device 28 of section 2 and that section is completely in the ONE condition.

The reversal of magnetization in branches $C_1$ and $D_1$ as they are restored to the ZERO condition induces equal and opposite currents in input circuit 10′–11′. There is also an accompanying transverse flux change, but it is parallel to the plane of winding for circuit 10′–11′ and has no effect. Since the currents resulting from the magnetization reversals can produce no significant net effect in that input circuit, there is no back coupling from section 1 during phase 2 of the shift operation.

It should also be noted that, during each of the described two phases of the shift operation, the currents generated in the coupling loop of leads 10″ and 11″ are limited in much the same manner that similar currents were limited in the embodiment of FIG. 2. For example, the maximum amplitude of induced current in the coupling loop during the first shift phase is limited to values which will not switch the two long branches $C_1$ and $D_1$ in series, but at the same time need be of only sufficient amplitude to switch long branch $C_2$ and short branch $A_2$. During the second phase the coupling loop current must be large enough to switch branches $B_2$ and $D_2$ with the aid of the bias but not so large as to override the bias and switch $A_2$ and $C_2$.

Figure 6:
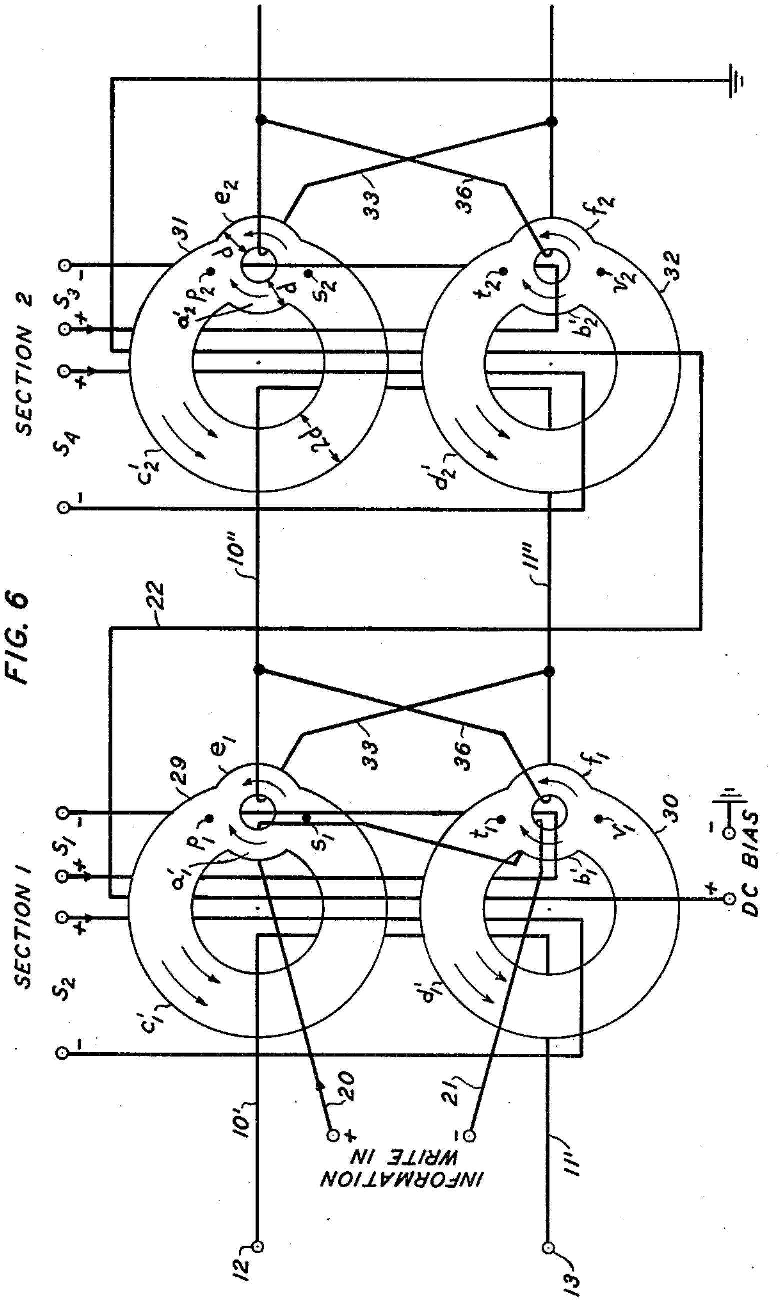

FIG. 6 illustrates another analogous version of the all-magnetic shift register of FIGS. 1, 2, and 4. In FIG. 6 each register section includes a pair of two-aperture magnetic devices 29, 30, 31, and 32. Each device is of the same, or a similar, material as the devices of FIG. 1 and includes one large aperture and one small aperture defined by branches wherein the associated magnetic material is similar to that of the cores in FIG. 1. In this case, however, the short branches defining the small aperture of the devices have an area, designated "$d$" on device 31, which is only one-half of the cross sectional area of the larger branches. Magnetic circuit branches which correspond to toroidal cores of FIG. 1 are indicated by similar reference characters, and two additional branches $e$ and $f$ are provided in each of the shift register sections to facilitate output circuit coupling to the four magnetic circuit nodes $p_1$, $s_1$, $t_1$, and $v_1$.

Input circuit leads 10′–11′ link branches $c_1'$ and $d_1'$ in opposite senses and these magnetic circuit branches couple the effects of input signals to the aforementioned magnetic circuit nodes. Output circuits in the form of connections 33 and 36 linking branches $e$ and $f$ are coupled to the nodes of the magnetic devices. These connections are multiplied and further connected by leads 10″ and 11″ to section 2 of the register. Flux changes in branches $e_1$ and $f_1$ cause aiding drive currents to be generated in the coupling conections 33 and 36. The corresponding connections linking branches $e_2$ and $f_2$ are also connected in parallel relationship.

Considering now the operation of FIG. 6, let us assume that all of the magnetic devices are in their ZERO condition with counterclockwise magnetization as indicated by arrows in the drawing. Bias is provided in the fashion of the bias circuit B of FIG. 2 by a lead 22 which links only the large apertures of the devices in series and in the same sense. The positive bias current applied to this lead tends to establish the threshold field in the devices in the direction of their ONE condition.

Write-in is accomplished by the application of a single pulse to leads 20 and 21 with the polarity indicated to partially switch branches $c_1'$ and $d_1'$, i.e., the inner portion closest to the aperture is switched but the outer portion remains the same. Branches $a_1'$ and $b_1'$ are completely switched to the ONE condition. This switching operation is aided by the influence of the bias current which was just mentioned. Due to the saturated condition of branches $e_1$ and $f_1$, it is not possible for write-in to produce an output signal on leads 10″ and 11″.

Write-in may also take place in a two-phase operation by signals applied to leads 10′ and 11′ in the same fashion that drives signals are shifted into a section of the register as will be described.

After devices 29 and 30 are set to the ONE condition, an initial shift current is applied to circuit S1 linking branches $a_1'$ and $b_1'$. This switches branches $a_1'$ and $b_1'$ to the ZERO state and branches $e_1$ and $f_1$ to the set ONE state, developing an output signal current in the input leads 10″ and 11″ of section 2. With the illustrated parallel output connection, the flux changes in $e_1$ and $f_1$ are equal and generate sufficient current to switch $c_2'$ and $a_2'$ to the ONE condition. In this state $a_2'$ is magnetized downward and the inner portion of $c_2'$ is magnetized upward. No signal is generated in the input coupling leads 10′ and 11′ of section 1 at this time provided that the current applied at circuit S1 is insufficient to overcome the bias and reset paths $c_1'$ and $d_1'$.

In phase 2, current is applied to circuit S2 which overcomes the bias field and resets $c_1'$ and $d_1'$ to the ZERO state. Note that a signal in the input circuit 10′–11′ due to $c_1'$ switching is canceled by induced signal due to $d_1'$ switching so that there is no back propagation. When $c_1'$ and $d_1'$ are cleared, i.e., restored to ZERO, output legs $e_1$ and $f_1$ are fully reset to ZERO condition. This induces a signal in the output connections which is limited in amplitude so as to set legs $d_2'$ and $b_2'$ to the ONE condition without resetting $c_2'$ and $a_2'$. The bias, of course, assists in the latter operation.

Flux gain is usually desired in magnetic shift registers if for no other reason than to facilitate fan-out, i.e., the driving of plural loads from a single output circuit. Flux gain is also needed for regenerating losses of flux during transfers which result with non-ideal materials.

Figure 7:
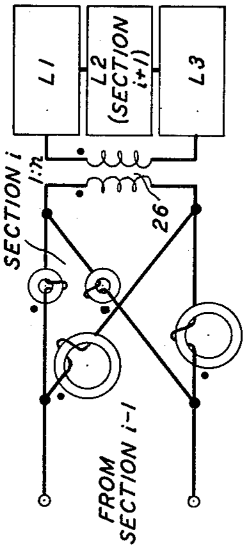

There are many ways known at the present time for providing such gain and one method using a transformer is shown in FIG. 7 by way of illustrative example. Two other methods using transformer functions are illustrated in FIGS. 8 and 9.

In FIG. 7 a shift register section of the lattice type and designated section $i$ is shown with its output circuit coupled by means of a transformer 26 to plural loads $L_1$, $L_2$, and $L_3$. One of those loads, i.e., $L_2$, may be a subsequent section $i+1$ of the same shift register, while loads $L_1$ and $L_3$ may be of similar character or of a completely different character. Transformer 26 has a $1{:}n$ turns ratio to provide suitable voltage gain which in turn results in full switch input signals in each of the load circuits. This transformer may, for example, be an air core type which is not readily saturated so that shift register operating speed is not held down by the necessity for driving such a transformer into and out of saturation. Load circuits similar to those illustrated in this figure may also be used in connection with the arrangements indicated in FIGS. 8 and 9.

Figure 8:
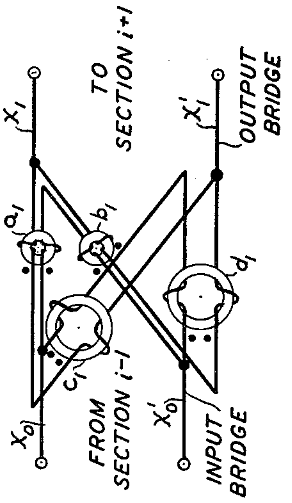

In FIG. 8 there is shown an embodiment wherein the cores comprising the storage elements of the shift register double also as cores for transformers to generate gain. In this case an input bridge lattice engages the cores $a_1$, $b_1$, $c_1$, and $d_1$ in the same manner illustrated in FIG. 1. However, each of these cores also includes a secondary winding and all of the latter windings are interconnected in an output bridge arrangement. The input nodes $x_0$ and $x_0'$ in this case are on the input bridge lattice for the section while the output nodes $x_1$ and $x_1'$ of the section are on the output bridge lattice as illustrated in FIG. 8. An appropriate turns ratio $n_p:n_s$ may be utilized on each of the cores to produce gain which is appropriate to the desired application.

Figure 9:
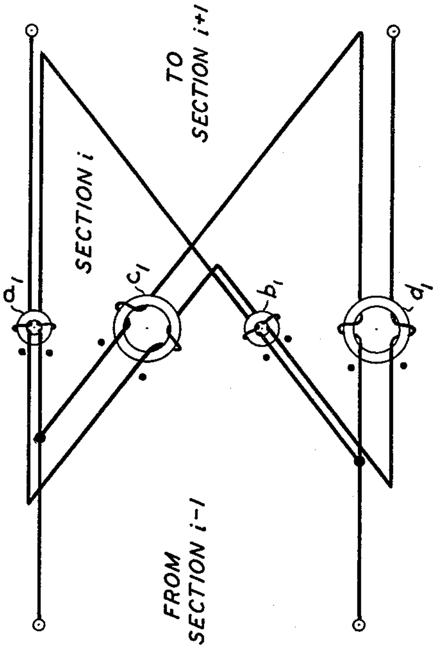
FIGS. 7 through 9 show different transformer arrangements that may be utilized in connection with the shift register of the invention for producing flux gain.

FIG. 9 illustrates another embodiment utilizing principles similar to those of FIG. 8, but in this case the secondary windings on the respective cores of the lattice are connected in series instead of in a bridge lattice configuration. The series connection of secondary windings results in two series aiding secondary voltages and produces twice the voltage gain of the configuration shown in FIG. 8 for equal turns ratios on the cores of the two configurations. This type of flux gain arrangement could also be achieved in the embodiment of FIG. 6 by connecting the output circuit loops linking branches $e$ and $f$ in series rather than in parallel.

Although this invention has been shown and described in connection with particular embodiments and applications thereof, it is to be understood that these are presented by way of illustration only and that additional modifications and applications, which will be apparent to those skilled in the art, are included within the spirit and scope of the invention.

What is claimed is:

1. A controllable information storage network comprising
- an input connection and an output connection conjugately related through said network so that signals applied at either of said connections produce no significant signal at the other of said connections,
- two pairs of magnetic elements coupled to one another, each of said elements having two stable conditions of flux remanence between which it may be switched by the application of a properly oriented magnetic field,
- means applying to said input connection a signal for generating a magnetic field to switch at least the two elements of one of said pairs of elements to the same one of said stable conditions, and
- means applying a magnetic field to an element of each of said pairs to switch such elements to a second one of said stable conditions to generate a signal at said output connection.

2. The controllable storage network in accordance with claim 1 in which
- said elements are toroidal magnetic cores coupled to one another by a closed connection linking said cores alternately in opposite senses.

3. The controllable storage network in accordance with claim 1 in which
- said elements are plural magnetic circuit branches connected in parallel magnetic circuit relationship with one another.

4. The controllable storage network in accordance with claim 1 in which
- the elements of a first one of said pairs are two magnetic circuit branches connected in parallel magnetic circuit relationship to form a closed magnetic flux path, the elements of a second of said pairs are similarly arranged magnetic circuit branches, and
- said input connection links both of said paths.

5. The controllable storage network in accordance with claim 1 in which
- said coupled elements form a plurality of branch paths having nodal circuit points at the junctions of said paths,
- said input connection is coupled to at least one of said points,
- said output connection is coupled to at least a different one of said nodal points which is conjugately related to the nodal point of said input circuit so that the simultaneous switching of the elements of either one of said pairs produces no effective output signal but the simultaneous switching of an element of each of said pairs produces an output signal.

6. The network in accordance with claim 5 wherein said paths comprise the four arms of an electric circuit bridge and said nodal points are the terminals of the respective bridge diagonals,
- said magnetic elements are toroidal magnetic cores electromagnetically coupled to different arms of said bridge, said input connection is coupled to the terminals of one of said diagonals, and
- said output connection is coupled to the terminals of the other of said diagonals.

7. The network in accordance with claim 6 which comprises in addition means coupling switch signals in a first phase to the cores of one pair of arms of said bridge which are series connected between the terminals of said one diagonal,
- means coupling switch signals in a second phase to the cores of a second pair of arms of said bridge that are series connected between the terminals of said one diagonal, and
- said switch signals generate fields tending to switch their respective cores to said second condition.

8. The network in accordance with claim 7 in which said cores coupled said first pair of bridge arms have a smaller toroidal diameter than said cores coupled said second pair of bridge arms, and wherein all of said cores have substantially the same cross sectional area of magnetic material.

9. The network in accordance with claim 5 in which said paths comprise magnetic circuit branches of a three-aperture magnetic device arranged so that said nodal points are nodes in the magnetic circuit thereof,
- said input connection is inductively coupled to a first one of said nodes, and
- said output connection is inductively coupled to a second one of said nodes.

10. The network in accordance with claim 9 in which said magnetic device has substantially uniform cross sectional area except at said nodes,
- two of the apertures of said magnetic device are much larger than the third aperture thereof,
- said input connection is responsive to flux changes in a first direction at said first node, and
- said output connection is responsive to flux changes at said second node in a second direction that is transverse to said first direction.

11. The storage network in accordance with claim 5 in which said paths comprise magnetic circuit branches of two two-aperture magnetic devices wherein said nodal points are nodes in the magnetic circuits thereof,
- said input circuit is coupled to one circuit branch of each of said devices, and
- said output circuit is coupled to another branch of each of said devices.

12. A magnetic device shift register comprising a cascade of bridge lattice networks each having a different bistable magnetic device in electromagnetic engagement with each arm thereof,
- each of said networks having input connections at the terminals of a first diagonal thereof and having output connections at the terminals of a second diagonal thereof, and
- a multiphase shift circuit coupled for switching said devices to predetermined ones of their stable conditions.

13. The shift register in accordance with claim 12 in which said shift circuit comprises means applying switching signals to two devices of each lattice in different phase from switching signals applied to the remaining two devices thereof.

14. The shift register in accordance with claim 12 in which said shift circuit comprises means applying switching signals in different phases to the pairs of devices engaging a first pair of bridge arms connected in series between the terminals of said first diagonal, and to the devices engaging the other pair of bridge arms which are connected in series between the same diagonal terminals.

15. The shift register in accordance with claim 14 in which said devices are toroidal magnetic cores, and
the cores of said first pair of bridge arms have the same magnetic cross sectional area as, but a much smaller toroidal diameter than, the cores engaging the other arms of said bridge.

16. The shift register in accordance with claim 12 in which an information bit in said register is represented by maintaining four cores in two successive lattice networks of said cascade in one stable condition,
said shift connections comprise four circuits applying signals in different phases to the devices of said two successive lattice networks,
a first one of said four shift circuits couples signals to two devices electromagnetically engaging first and second arms of a first one of said two networks, which arms are connected in series between terminals of the first diagonal thereof,
a second one of said shift circuits couples signals to two further devices engaging third and fourth arms series connected between the terminals of said first diagonal in said first network, and
the third and fourth of said shift circuits couple signals to the devices of the second one of said two lattice networks in the same manner that said first network receives signals from said first and second shift circuits.

17. The shift register in accordance with claim 16 in which said devices are toroidal cores.

18. The shift register in accordance with claim 17 in which all of said cores have the same magnetic characteristics, and
the cores electromagnetically engaging the first and second arms of each of said bridge lattice networks have a much smaller toroidal diameter than the cores engaging the other arms of each of said networks.

19. The shift register in accordance with claim 12 in which said cascade comprises means coupling the terminals of said second diagonal of one of said networks to the respective terminals of said first diagonal of the next succeeding network for generating flux gain.

20. The shift register in accordance with claim 19 in which said flux gain generating means comprises a transformer having a primary winding connected to said second diagonal of said first network and having a secondary winding connected to said first diagonal of said second network.

21. The shift register in accordance with claim 20 in which said transformer is adapted for nonsaturable operation in response to currents in said networks.

22. The shift register in accordance with claim 20 in which said primary winding comprises circuit leads of said first network electromagnetically coupled to the devices of said first network, and
said secondary winding comprises a further lattice network having circuit leads also engaging the devices of said first network, said further lattice network having one diagonal thereof corresponding to said second diagonal of the first-mentioned lattice network, and
means connecting said second diagonal of said further lattice network to the terminals of said first diagonal of said second network.

23. The shift register in accordance with claim 20 wherein
said primary winding comprises portions of circuit leads in said first network electromagnetically engaging the magnetic devices thereof,
said secondary winding comprises four lead portions connected in series between said first diagonal of said second network, and
each of said portions is electromagnetically coupled to a different device in said first network.

24. The shift register in accordance with claim 23 in which said transformer has a unity turns ratio.

25. A shift register comprising
an electric circuit for information transfer, said circuit being arranged as an iterative, bridge lattice with two, cascade connected, bridge circuits per bit position in the register,
a plurality of magnetic cores with rectangular hysteresis characteristics defining two stable conditions of magnetic remanence, each core being arranged in electromagnetic engagement with a different arm of one of said bridges,
four shift circuits supplying drive signals in different phases to the bridges of each bit position, each of said shift circuits electromagnetically engaging a different interconnected pair of said cores of such bit position, all of said shift signals tending to drive such cores to one of said conditions, and
bias means engaging all of said cores and tending to drive said cores toward the other one of said conditions.

26. In a magnetic device shift register having drive and bias connections in each of a plurality of stages thereof,
a four-terminal information circuit having two input terminals and two output terminals,
a first lead connecting one of said input terminals to one of said output terminals, a second lead connecting the other of said input terminals to the remaining one of said output terminals,
a first plurality of toroidal magnetic cores one half of which are arranged to be linked in the same sense by said first lead and the other half of which are arranged to be linked by said second lead in the same sense,
a plurality of branch circuit leads cross-connecting said first and second leads from the input terminal side of each of said cores linked by said first lead or said second lead to the output side of a corresponding core linked by said second lead or said first lead, respectively, and
a second plurality of toroidal magnetic cores each linked by a different one of said branch circuit leads in the same sense for current in the respective branch lead,
all of said cores having substantially rectangular hysteresis characteristics.

27. In a shift register, a signal translation stage comprising
an energy storage circuit including a plurality of magnetic elements coupled to one another, each of said elements comprising material with essentially rectangular hysteresis characteristics defining two stable conditions of magnetic remanence, said elements being switchable between said conditions upon application of magnetic fields of appropriate orientation,
an input circuit coupled to said storage circuit for generating magnetic fields therein tending to drive a first pair of said elements into a first of said conditions in response to signals of a first polarity and tending to drive a second pair of said elements into said first condition in response to signals of a second polarity, and
an output circuit coupled to said storage circuit to derive an output signal in response to the switching of an element of each of said pairs together but nonresponsive to the switching of both elements of either of said pairs at approximately the same time.

28. In a magnetic device shift register having a multiphase drive circuit connected thereto for shifting signals through said register.

a cascade of bridge lattice networks each having a different bistable magnetic device engaging each of the arms thereof, each of said networks having input signals applied to the terminals of a first diagonal thereof and an output circuit coupled to the terminals of a second diagonal thereof, means generating a flux gain in said cascade, and, means connecting said gain generating means both to the second diagonal of a network in said cascade and to the first diagonal of a succeeding one of said networks in said cascade.

29. In a magnetic device shift register having a multiphase circuit for shifting information signals therethrough, a cascade of bridge lattice networks each having a different bistable magnetic device electromagnetically engaging each arm thereof, means applying shifting signals to a pair of the devices of each of said lattice networks in different phase from signals applied to the remaining devices of said network, and means applying bias to at least a portion of the devices of said network with a polarity tending to oppose the effects of said switching signals in said devices.

30. The shift register in accordance with claim 29 in which said devices are toroidal cores all having the same cross sectional area of magnetic material, a first pair of cores in each of said networks having a much smaller toroidal diameter than the remaining cores associated with said network, and said bias means comprises a direct-current bias circuit linking said remaining cores and tending to oppose the effects of said drive signals.

References Cited by the Examiner

UNITED STATES PATENTS

| | | | |
|---|---|---|---|
| 2,979,702 | 4/61 | Zarcone et al. | 340—174 |
| 3,096,509 | 7/63 | Rosenberg et al. | 340—174 |

IRVING L. SRAGOW, *Primary Examiner.*